Figures 1, 2, 3:
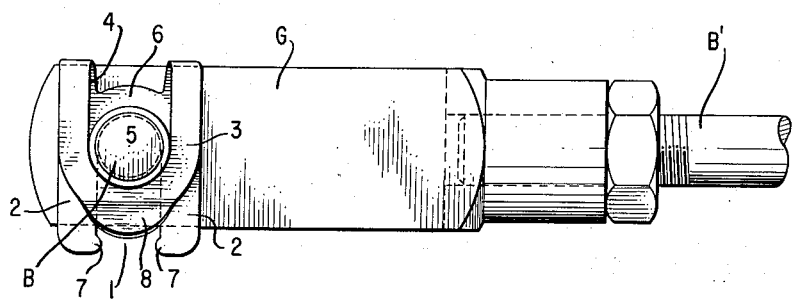

Dec. 31, 1963

W. ENGELMANN 3,115,805

SPRING RETAINER CLIP FOR GROOVED PIN

Filed Sept. 3, 1959

INVENTOR.
WALTER ENGELMANN
BY Dicke + Craig
ATTORNEYS.

United States Patent Office 3,115,805
Patented Dec. 31, 1963

3,115,805
SPRING RETAINER CLIP FOR GROOVED PIN
Walter Engelmann, Eislingen (Fils), Germany
Filed Sept. 3, 1959, Ser. No. 837,994
Claims priority, application Austria Sept. 4, 1958
1 Claim. (Cl. 85—8.8)

It is known to secure and lock in place bolts, pins, shafts, studs and the like disposed in bores of machine parts, by means of guard rings or locking rings which are engaged in flutes or annular grooves of the pin or the like. Such rings, however, have the disadvantage that their spring action passes across the back of the material, i.e. they are subjected to tensile stresses. When exposed to a tensile stress, the elastic limit of a material may be readily exceeded, in particular when the ring is applied or mounted with the aid of a pair of pliers. This is of particular disadvantage in the case of small diameters, since the clamping action may be readily lost thereby and the ring becomes useless. Sufficient safety thus is not ensured. It therefore is necessary to fabricate the known locking and securing rings with high accuracy and maintaining tolerances as small as possible and maintaining such tolerances also for the annular grooves.

A further disadvantage of known means of this kind resides in the fact that the ring cross-section which per se is narrow, has only small supporting faces and, moreover, is unequal in most cases. When securing machine parts involving rounding-off radii, in ball bearings or the like, these rings therefore often have to be provided with lugs or the like for increasing the bearing surface and maintaining the elasticity. In other cases, such as for example when securing joint pins in forked heads for operating levers, a positive seat of the known locking means, in particular against shock or blows or against loosening, is not positively ensured.

My present invention aims to eliminate the disadvantages mentioned above. The present invention relates to improvements in locking means for bolts, shafts, studs and the like disposed in bores of machine parts and comprising a securing means engaged in an annular groove of said bolt or the like. My invention is characterized in that this locking means is yoke-shaped, one yoke half portion being formed as a guiding element when applying the mounting means, and the other half portion is formed as a springy locking element. The invention is illustrated as follows:

FIG. 1 shows an elevation of the locking means as mounted on the joint pin of a fork-head of an operating lever, FIG. 2 is a sideview thereof, FIG. 3 is an elevation of the locking means per se.

The locking means shown in FIGS. 1 and 2 is shown in connection with the joint pin B of the fork-head G of the only partially shown operating linkage B', and is made of a spring-steel band and yoke-shaped. One yoke half portion is provided, as shown in FIG. 1, with a lead-in slot 1 open at one end so that two legs 2 are formed which, as shown in FIG. 2, are slightly bent in the longitudinal direction thereof toward the adjacent yoke half portion. The distance between legs 2 is approximately equal to the inside diameter of a circumferential groove 5 provided in pin B, and is smaller than the diameter of the remainder of pin B.

As shown in FIGURE 1 and in FIGURE 3, the other half portion 3 is also provided with a slot 4 which is closed at both ends. The two legs 2 close to their point of bending are interconnected by the web 6. The legs 2 at their free ends comprise opposite noses 7 of which the purpose is described later. The flaplike half portion 3 comprises, for convenient seizure, a grip 8 angularly bent outward. The recess 9 is of a diameter to fit over the joint pin B or the like.

Let it be assumed that the above-described locking means is to be applied to a fork-head G provided with a pivot pin B for an operating lever B' as shown in FIGS. 1 and 2. Said means is seized manually and slid on that end of pin B which is provided with the aforesaid circumferential groove 5, the legs 2 serving as guides within groove 5, and the internal semicircular portion of web 6 bracing itself against pivot pin B, the flap-like half portion of the locking means being moved over the conically tapered end of pin B until the semi-circular portion defining slot 4 at its outer end, snaps over pin B.

For disengaging the locking means from pin B, grip 8 is seized, and the flaplike half portion of the means is raised clear of pin B.

By virtue of the noses 7 provided on the free ends of the legs 2, that portion of the locking means which is provided with the legs 2 cannot loosen from pin B when the locking means fails at its point of bending.

The various locking means described possess the advantage of constructional simplicity and may be quickly and conveniently applied and disengaged without tools. They posses excellent elasticity and thus ensure a positive locking action for bolts, shafts, pins and studs disposed in bores of machine parts.

What I claim as new and desire to secure by Letters Patent is:

In a joint structure having a member to be secured, said member being provided with an aperture, a pin member extending through said aperture and having an end projecting therefrom, said pin member having a circular circumferential groove closely adjacent to the outer surface of said member to be secured, the improvement comprising a locking spring device of cotter pin like shape as seen in side view connected to said end of said pin member, said spring device having an inner arm portion abutting said outer surface of said member and an outer arm portion secured to said inner arm portion by a curved connecting portion, said inner arm portion including two resilient spaced legs and a connecting web therebetween combining to form an elongated slot which opens at the free end of said inner arm and having a width substantially equal to the diameter of the base of said circumferential groove, each of said legs being provided at the end thereof with a small projection extending into said elongated slot, said projections being spaced from each other a distance slightly smaller than the diameter of the base of said groove, said legs being curved toward said outer arm as seen in side view and adapted to be resiliently spread to enable insertion into said groove in a direction substantially at right angles to the axis of said pin member and to be resiliently flattened during insertion so that said legs are pressed against said outer surface of said pin member, said outer arm portion having a free end bent obliquely upwardly away from said curved portion and provided with an elongated aperture extending from said free end through said curved portion to said connecting web to increase the resiliency of said spring device, said elongated aperture having a minimum width at least equal to the width of said slot and having a width at least at the front thereof substantially equal to the outside diameter of said pin member so that upon insertion of said legs into said groove, said free end resiliently snaps over the end of said pin member and the portion of said pin member outwardly of said groove is received within said elongated aperture.

References Cited in the file of this patent

UNITED STATES PATENTS

| | | |
|---|---|---|
| 990,847 | Crandall | May 2, 1911 |
| 1,038,664 | Schell | Sept. 17, 1912 |
| 1,297,995 | Bralove | Mar. 25, 1919 |
| 1,933,724 | Fox | Nov. 7, 1933 |
| 2,278,708 | Miller | Apr. 7, 1942 |
| 2,402,693 | Summerbell | June 29, 1946 |
| 2,534,105 | Churchill | Dec. 12, 1950 |
| 2,868,484 | Burrise | Jan. 13, 1959 |

FOREIGN PATENTS

| | | |
|---|---|---|
| 662,879 | Great Britain | Dec. 12, 1951 |
| 1,061,572 | Germany | July 16, 1959 |